United States Patent
Grinstein et al.

(10) Patent No.: US 12,261,918 B2
(45) Date of Patent: Mar. 25, 2025

(54) CROSS-CLOUD WORKLOAD IDENTITY VIRTUALIZATION

(71) Applicant: Control Plane Corporation, Santa Rosa Valley, CA (US)

(72) Inventors: Doron Grinstein, Santa Rosa Valley, CA (US); Julian Vassev, Sofia Bulgaria (BG); Dan Wilson, Bellevue, WA (US)

(73) Assignee: CONTROL PLANE CORPORATION, Santa Rosa Valley, CA (US)

( * ) Notice: Subject to any disclaimer, the term of this patent is extended or adjusted under 35 U.S.C. 154(b) by 0 days.

(21) Appl. No.: 18/150,015

(22) Filed: Jan. 4, 2023

(65) Prior Publication Data

US 2023/0145488 A1     May 11, 2023

Related U.S. Application Data

(62) Division of application No. 16/942,253, filed on Jul. 29, 2020, now Pat. No. 11,848,998.

(51) Int. Cl.
*G06F 9/455* (2018.01)
*H04L 9/14* (2006.01)
(Continued)

(52) U.S. Cl.
CPC .......... *H04L 67/51* (2022.05); *G06F 9/45558* (2013.01); *H04L 63/0853* (2013.01);
(Continued)

(58) Field of Classification Search
CPC ................ H04L 63/126; H04L 63/107; G06F 200/45587; G06F 2009/45595
See application file for complete search history.

(56) References Cited

U.S. PATENT DOCUMENTS 9,521,194 B1   12/2016   Gabrielson
10,298,577 B1 *   5/2019   Aithal ................. G06F 9/45558
(Continued)

OTHER PUBLICATIONS

Amazon, Amazon Elastic Compute Cloud, User Guide, Jun. 13, 2020 (Year: 2020).*
(Continued)

*Primary Examiner* — Christopher B Robinson
*Assistant Examiner* — Ho T Shiu
(74) *Attorney, Agent, or Firm* — SLATER MATSIL, LLP

(57) ABSTRACT

A system for cross cloud workload identity virtualization including a program having instructions to route a first network call from a workload in a first cloud computing environment addressed to a first cloud computing environment instance metadata service (IMS) having destination data with an IP address of 169.254.169.254 to a universal IMS (UIMS) different from the first cloud computing environment IMS, route a second network call from the workload addressed to a destination other than the first cloud computing environment IMS to the destination indicated by the second network call, respond to the first network call with credentials valid for accessing a cloud service provided in a second cloud computing environment. The workload can access the cloud service from the first cloud computing environment, and access the cloud service from a third cloud computing environment different from the first cloud computing environment.

19 Claims, 6 Drawing Sheets

(51) Int. Cl.
   *H04L 9/32* (2006.01)
   *H04L 9/40* (2022.01)
   *H04L 67/51* (2022.01)
(52) U.S. Cl.
   CPC ............... *G06F 2009/4557* (2013.01); *G06F 2009/45595* (2013.01)

(56) References Cited

U.S. PATENT DOCUMENTS

| | | | |
|---|---|---|---|
| 10,620,991 | B1 | 4/2020 | Lindner et al. |
| 10,623,390 | B1 | 4/2020 | Rosenhouse |
| 2010/0010944 | A1 | 1/2010 | Cheng et al. |
| 2014/0082705 | A1* | 3/2014 | Robinson ............... H04L 63/08 726/4 |
| 2014/0280961 | A1 | 9/2014 | Martinez et al. |
| 2015/0317169 | A1 | 11/2015 | Sinha et al. |
| 2017/0171211 | A1 | 6/2017 | Tsurbeleu et al. |
| 2017/0308856 | A1 | 10/2017 | Bursey |
| 2017/0317974 | A1 | 11/2017 | Masurekar et al. |
| 2018/0359238 | A1 | 12/2018 | Appiah et al. |
| 2018/0359242 | A1 | 12/2018 | Appiah et al. |
| 2019/0058594 | A1* | 2/2019 | Kludy ................... H04L 9/3247 |
| 2019/0213649 | A1 | 7/2019 | Van Biljon et al. |
| 2019/0297072 | A1 | 9/2019 | Kulkarni et al. |
| 2019/0319958 | A1* | 10/2019 | Ocher .................... H04L 63/18 |
| 2019/0334757 | A1 | 10/2019 | Hill et al. |
| 2019/0349369 | A1* | 11/2019 | Bengtson ............ H04L 63/0281 |
| 2020/0112487 | A1 | 4/2020 | Inamdar et al. |
| 2020/0128046 | A1 | 4/2020 | Schaefer et al. |
| 2020/0136825 | A1 | 4/2020 | Gupta et al. |
| 2021/0218616 | A1 | 7/2021 | Bugenhagen et al. |

OTHER PUBLICATIONS

Amazon, Amazon Elastic Compute Coud, User Guide, Jun. 13, 2020, 88 pages.

"DynamoDB Connector by Fivetran," downloaded from https://console.cloud.google.com/marketplace/details/fivetran-bq-dts/dynamo-db?cloushell=false on Jul. 29, 2020, 1 page.

"How do I access AWS services with a Google Cloud Function?," downloaded from https://stackoverflow.com/questions/43163292/how-do-you-access-aws-services-within-a-google-cloud-function on Jul. 29, 2020, 2 pages.

Walsh, K. et al., "Intra-Cloud and Inter-Cloud Authentication," 2017 IEEE 10th International Conference on Cloud Computing, 2017, 8 pages.

Zahoor, E. et al., "Authorization Policies Specification and Consistency Management within Multi-Cloud Environments," Advances in Databases and Information Systems, Springer International Publishing, XP047494856, Nov. 2018, 17 pages.

* cited by examiner

CROSS-CLOUD WORKLOAD IDENTITY VIRTUALIZATION

CROSS-REFERENCE TO RELATED APPLICATIONS

This application is a divisional of, and claims the benefit of, U.S. application Ser. No. 16/942,253, filed on Jul. 29, 2020, which application is hereby incorporated herein by reference.

TECHNICAL FIELD

The present disclosure relates generally to a system and method for providing identity translation across multiple cloud computing platforms, and, in particular embodiments, to a system and method for handling requests from workloads in a first cloud computing platform and providing credentials for the workloads to seamlessly access cloud services on a second, different, cloud platform.

BACKGROUND

Cloud platforms have recently become a prominent way for developers, businesses, service providers, and the like, to acquire computing resources. Cloud platforms host a variety of services useful for various computing tasks and allow controllable computing resources to be provisioned for the desired computing tasks. Cloud platforms permit service consumers, namely the developers, businesses, and service providers, to offload the hardware purchasing and management of hardware, as well allowing the service consumers to scale up (or down) the system usage.

However, each cloud platform is, in effect, a closed ecosystem. Software executing on a cloud platform requires different credentials to access functions of different cloud platforms, which generally requires software to be written in a manner that accommodates conveyance of different credentials to different cloud platforms in order to obtain their services.

SUMMARY

An embodiment system may have a non-transitory computer readable medium having a program stored thereon for execution by a computer processor, the program including instructions to route a first network call that originates from a workload in a first cloud computing environment and that is addressed to a first cloud computing environment instance metadata service (IMS) identified by destination data comprising an internet protocol (IP) address of 169.254.169.254 to a universal IMS (UIMS) different from the first cloud computing environment IMS and running on the first cloud computing environment, route a second network call that originates from the workload and that is addressed to a destination other than the first cloud computing environment IMS to the destination indicated by the second network call, respond to the first network call with credentials that are valid for accessing a cloud service provided in a second cloud computing environment separate from the first cloud computing environment, where the workload is operable to access the cloud service from the first cloud computing environment, and where the workload is further operable to access the cloud service from a third cloud computing environment different from the first cloud computing environment.

An embodiment system includes a processor, and a non-transitory computer readable medium having a program stored thereon for execution by the processor, the program including instructions to receive an instance metadata service request sent by a workload operating on a first execution environment of a first cloud computing platform to an instance metadata service of the first execution environment, determine a target cloud platform of the instance metadata service request, wherein the target cloud platform is a second cloud computing platform different than the first cloud computing platform, determine a canonical identity of the workload, determine, according to the canonical identity and the target cloud platform, a logical identity associated with the workload by the target cloud platform, and retrieve a security token from a security token service on the target cloud platform, where the security token is data authorizing the workload to access a cloud service on the target cloud platform.

An embodiment method includes receiving, by a universal instance metadata service (UIMS) operating on a first execution environment of a first cloud computing platform, an instance metadata service request sent by a workload operating on the first execution environment, determining, by the UIMS, a target cloud platform based on the instance metadata service request, where the target cloud platform is a second cloud computing platform different than the first cloud computing platform, determining, according to a canonical identity of the workload and the target cloud platform, a logical identity associated with the workload by the target cloud platform, and retrieving a security token from a security token service on the target cloud platform, where the security token is data authorizing the workload to access a cloud service on the target cloud platform.

An embodiment method includes providing, on a first cloud platform, a masquerading instance metadata service to which an instance metadata service request is routed, where the instance metadata service request originates from a workload deployed on the first cloud platform, providing a request routing element, and configuring the request routing element to detect a communication from the workload and selectively route the communication to the masquerading instance metadata service according to whether the communication is an instance metadata service request, where the masquerading instance metadata service returns, to the workload, valid credentials that are credentials to a cloud service operating in a second cloud platform, and where the workload successfully consumes the cloud service operating in the second cloud platform using the credentials.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the relationships between various components and to the spatial orientation of various aspects of components as the devices or elements of various systems are depicted in the attached drawings. However, as will be recognized by those skilled in the art after a complete reading of the present disclosure, the devices, systems, components, members, apparatuses, or the like, described herein may be positioned in any desired deployment or communications topology. Thus, the use of terms related to connection, communication, or other like terms to describe transfer of data or signals between various components or to describe the relationship of such components should be understood to describe a relationship between the components or deployment of aspects of such components, respectively, as the systems and methods described herein may be arranged or deployed in any desired topology.

Embodiments of the present disclosure are directed to providing a workload control system that allows a workload deployed on a cloud platform execution environment to access features, services, data, or other software deployed or available on another cloud platform. A workload is a computer program executing within at least one execution environment and may be hosted on a cloud platform or other environment that provides computing resources for third party software or services.

A workload control system (WCS) facilitates dynamic deployment and/or migration of a workload across a plurality of execution environments. Embodiments of the WCS and accompanying systems enable a workload to make authenticated and authorized network calls to at least one service on which the workload depends. For example, a workload executing on a first cloud platform may access a service, data, storage, or the like, provided on a second cloud platform under management and control of the WCS.

Figure 1:
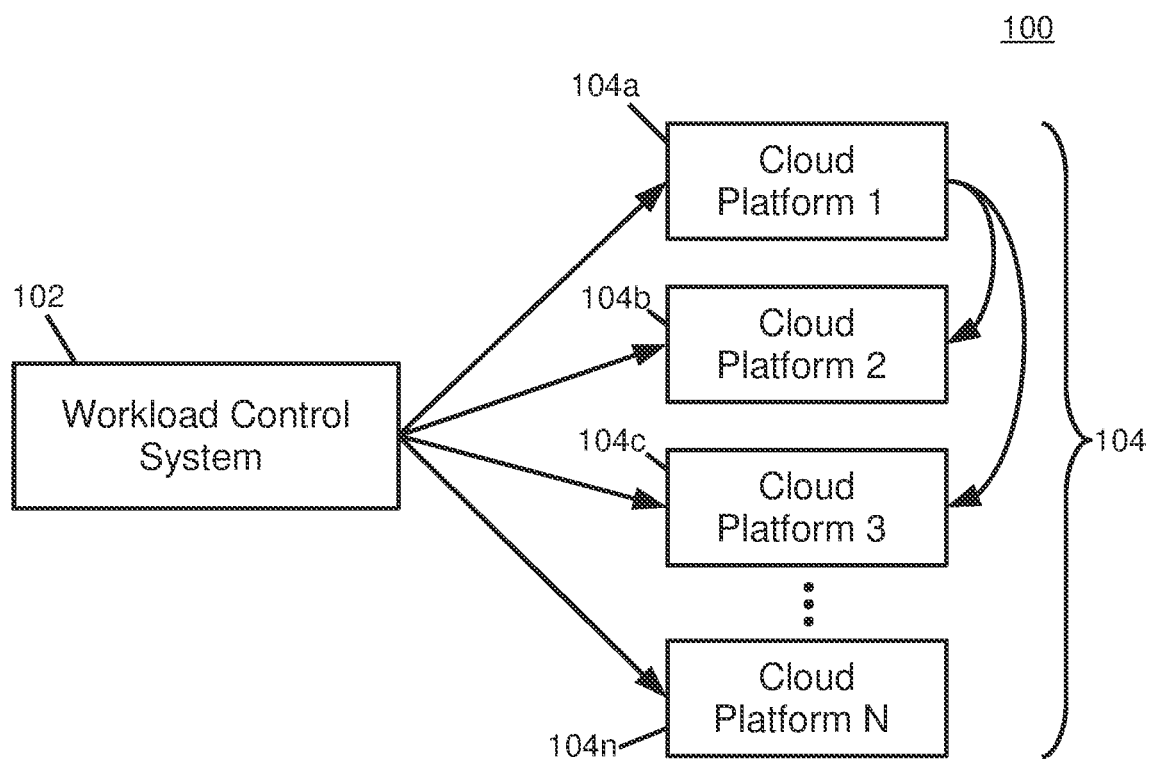
FIG. 1 illustrates a workload management system according to one or more embodiments.

FIG. 1 illustrates a workload management system 100 according to one or more embodiments. A workload control system (WCS) 102 is in signal communication with one or more execution environments 104 for cloud platforms and may control workloads being hosted on the execution environments 104, with authentication systems, account management systems, services, or the like, provided on the cloud platforms. The execution environments 104 may include one or more individual execution environments 104*a* . . . 104*n*, with the WCS 102 communicating with each of the individual execution environments 104*a* . . . 104*n* separately. Each of the individual execution environments 104*a* . . . 104*n* may be provided for a cloud platform such as Amazon Web Services (AWS), Microsoft Azure (Azure), Google Cloud Platform (GCP), Digital Ocean, Oracle Cloud, IBM Cloud, Alibaba Cloud, Pitney Bowes Commerce Cloud, or the like. It should be noted that the individual execution environments 104*a* . . . 104*n*, may be for a mix of different cloud platforms, with the WCS 102 providing support for making authenticated and authorized calls across different execution environments 104 or cloud platforms. The different execution environments 104*a* . . . 104*n* may be execution environments of different cloud service providers, and may have different operational formats such as different communications formats, data structures to accessing data or operating within the execution environment, different metadata access formats, different authentication structures, and the like.

Thus, the WCS 102 may provide authentication and authorization management in support of authorized utilization of a service by a workload. This permits a workload to be deployed across multiple different execution environments 104 or cloud platforms and to consume at least one service on which the workload depends, as if it is executing in the same execution environment or cloud platform. Thus, a workload is able to access a service that is provided in through an execution environment or cloud platform different than the execution environment or cloud platform on which the workload is deployed. Therefore, a workload is able to be deployed and executed within any environment, unmodified, and is still able consume cloud services of its host environment and other environments as if the various environments have virtually merged.

Figure 2:
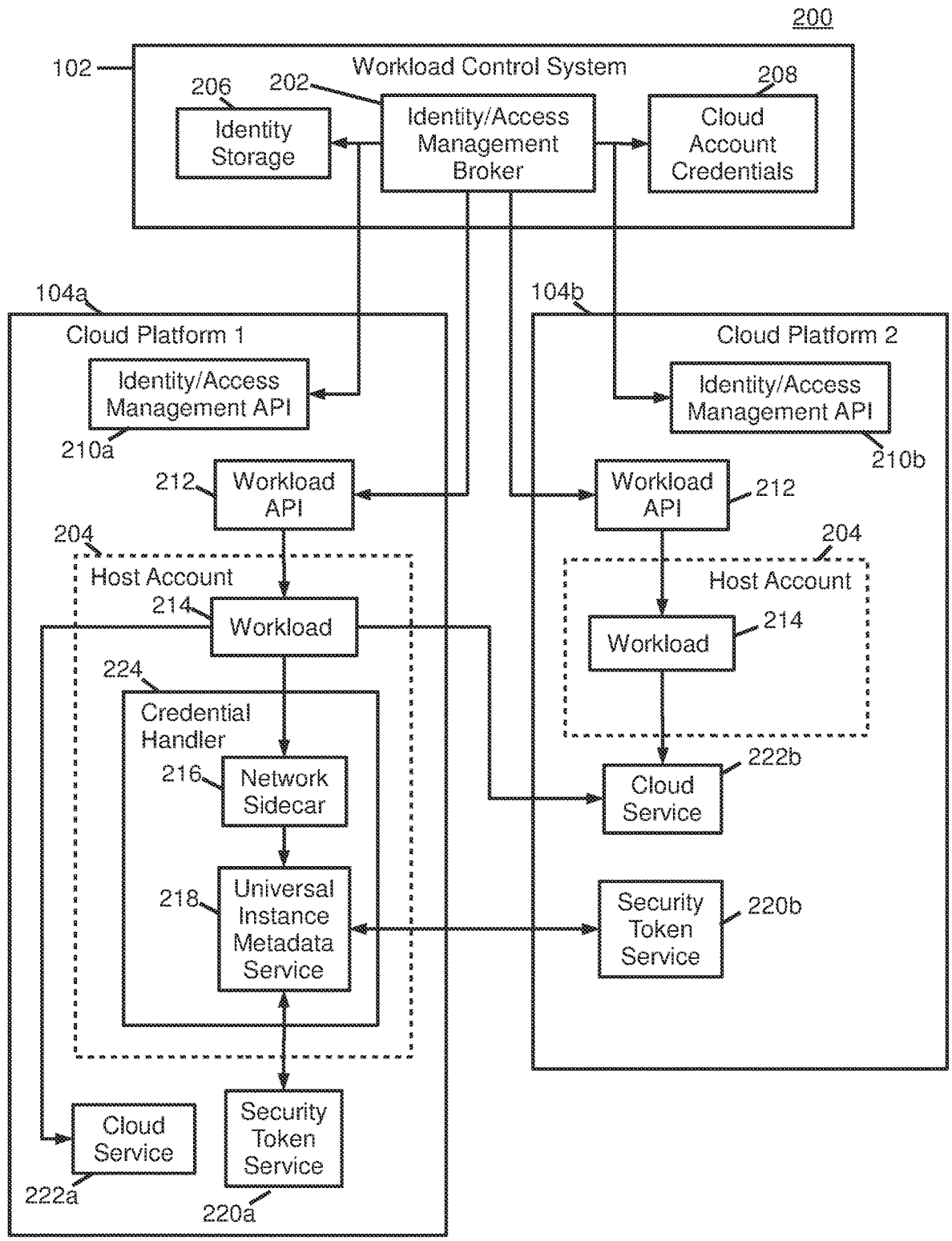
FIG. 2 is a logical diagram of a cloud computing access integration system according to some embodiments.

FIG. 2 is a logical diagram of a cloud computing access integration system 200 according to some embodiments. The system includes a WCS 102 connected to a first execution environment 104*a* and a second execution environment 104*b*. The WCS 102 may be software stored on a non-transitory computer readable medium and executed on one or more computers having one or more processors and memory. Thus, a WCS host system may be a computer having one or more processors and a computer readable non-transitory medium storing a program for execution by the one or more processors, with the program having instructions for providing the WCS 102. Similarly, the execution environments 104 may be hosted on one or more computers having one or more processors and computer readable non-transitory medium storing a program for execution by the one or more processors, with the program having instructions for providing the workload, and features that support the WCS such as the credential handler 224.

The execution environments 104*a*, 104*b* are execution environments for workloads 214, functions, or other software, and while a workload 214 is illustrated as being deployed on a single execution environment 104*a*, embodiments of the disclosure are not limited to a workload, or a single execution environment 104*a*, as any number of execution environments 104*a*, 104*b* may be managed by the WCS 102. The execution environments 104*a*, 104*b* may be software systems running on one or more systems such as the cloud platforms of specific cloud service providers, such as Amazon Web Services (AWS), Microsoft Azure (Azure), Google Cloud Platform (GCP), Digital Ocean, Oracle Cloud, IBM Cloud, Alibaba Cloud, Pitney Bowes Commerce Cloud, or the like. A cloud platform or execution environment 104*a*, 104*b* may also be a system deployed within a private data center owned by a particular organization, or even within a single computer. Additionally, the execution environment 104*a*, 104*b* may be a system that is a region within a particular cloud service provider, and the different execution environments 104*a*, 104*b* may be provided or deployed on completely different cloud service provider or in a private data center. Thus, an execution environment 104*a*, 104*b* or cloud platform is a computer or plurality of internetworked computers providing one or more services by way of software stored on a computer readable non-transitory medium. The execution environment may provide cloud services 222*a* accessible by the workload 214. For example, object data storage (such as Amazon Simple Storage Service (S3), Amazon elastic File System (EFS), Google Cloud Storage, Microsoft Azure File, Disk or Blob Storage, or the like), database services (such as Amazon DynamoDB, Google Cloud SQL, Microsoft Azure SQL, or the like), on-demand video handling (such as Amazon CloudFront, Google Cloud CDN, Microsoft Azure Live and On-Demand Streaming, and the like), or any number of other data management services may be provided on the execution environments 104*a*, 104*b* as cloud services 222*a*.

The execution environment 104*a*, 104*b* may provide a platform or computing resources for running a workload 214 in a host account 204. The host account 204 may be a virtual space, virtual machine, set of computing resources assigned to a particular customer, or the like. In some embodiments, a provider of the WCS 102 may have a host account 204 that runs client workloads 214, with a credential handler 224 in the host account 204 provided to support cross-platform credential management during execution of the workload 214.

In some embodiments, the execution environments 104*a*, 104*b* may have application programming interfaces (APIs) that permit outside programs such as the WCS 102, to interact with the execution environments 104*a*, 104*b*. The APIs may include Identity and Access management (IAM) APIs 210*a*, 210*b* for handling identity management and authorization policy application, and a workload API 212 for controlling execution and operation of the workload 214.

The workload 214 is deployed in the first cloud platform 104*a*, and in some embodiments, the workload 214 may be deployed in a particular host account 204 so that the credential handler 224 is able to seamlessly support the workload execution. The WCS 102 provides authentication across multiple execution environments 104*a*, 104*b* for the workload 214 in combination with the credential handler 224. The WCS 102 maps an identity associated with the workload 214 to a logical identity that is acceptable on another execution environment, such as the second execution environment 104*b*, so that the workload 214 can access a second cloud service 222*b* on the second execution environment 104*b* while still having access to a first cloud service 222*a* running on the same, first execution environment 104*a* on which the workload 214 is running. A credential handler 224 intercepts instance metadata service requests or identity requests. The credential handler 224 initiates its own request to a security token service 220*b* in another execution environment 104*b* and retrieves a security token from the second execution environment 104*b*. The credential handler 224 provides the credentials to the workload 214 so that the workload 214 has credentials to access a service on an execution environment 104*b* different than the execution environment 104*a* on which the workload 214 is executed.

The WCS 102 may receive an input from a user, with the input representing a desired state for a workload 214. In some embodiments, the user may either be a human or a computer program acting on behalf of a human, or as part of an automated process, allowing the workload 214 to be manually controlled, or automatically controlled or initiated through the WCS 102. The desired workload state denotes the topology and other facets of workloads 214 on one or more cloud platforms 104*a*, 104*b*.

In some embodiments, the user input is, or comprises, a serializable set of bytes that encode facets of workloads to be executed within one or more execution environments. In some embodiments, the facets may be configuration parameters, rules, variables, setting, or other data controlling operational aspects of each workload and may include, but are not limited to, an execution state for each of the workloads, a size of virtual CPUs, a number of virtual CPUs, one or more node groups, specific clusters or cluster selectors, one or more cloud providers, one or more regions, one or more availability zones, one or more schedule preferences, scaling strategies, quotas, one or more alerting requirements, a quantity of memory to allocate, one or more network routing rules and/or restrictions, data storage facilities, authorization characteristics, security rules, geographical placement strategies, one or more cost-based placement strategies, or other metadata conveying a desired execution state for the workloads. Thus, the user may configure and start one or more workloads though the user input. The user input may also provide different facets for one or more workloads, permitting the user to configure, or control facets for, different workloads.

The WCS 102 has identity information retained in an identity storage 206 that may be a database, file or other data retained in a non-transitory computer readable memory or storage. The WCS 102 provides functionality to users for managing identities. These identities may be canonical identities used by the system 200 to positively identity workloads 214. Each canonical identity may be associated with a canonical authorization policy and one or more logical identities that are associated with different cloud platforms. The WCS 102 may store one or more canonical identities, and each workload 214 may be associated with at least one canonical identity stored within the system, and by extension, may have one or more associated logical identities. The identifier for the canonical identity, such as a unique number or a string, is stored in the identity storage 206, along with the logical identities and data associating or linking the canonical identities with their respective logical identities and a particular workload 214. The WCS 102 utilizes the identity storage 206 for creating, deleting, updating, and querying canonical identity data. The identity storage 206 may physically exist alongside or within the WCS 102, or it may exist in a different execution environment or on another cloud platform where it is accessible by the WCS 102 via a network connection.

In some embodiments, the WCS 102 also includes an Identity and Access Management (IAM) broker 202 that maps the canonical identity to applicable identity data in an execution environment 104*a*, 104*b* or cloud platform to one or more logical identities that are execution environment-specific identity constructs. In some embodiments, the IAM broker 202 provisions and de-provisions logical identities in at least one execution environment 104*a*, 104*b*. The logical identity or identity construct may have different structures or be referenced by different names in different cloud platforms, such as a "role" on AWS, a "service account" on GCP and a "managed identity" on Microsoft Azure.

For example, the canonical identity may be created through the WCS 102 after the workload is deployed, as a part of the workload being deployed on the execution environment 104*a*, or prior to the workload being scheduled to be deployed onto the execution environment 104a. The name of the canonical identity may be the same as, based on, or different from the name of the workload name or identifier. Having a name for the canonical identity that is the same as, or based on, the workload name permits the WCS 102 to identify the required canonical identity from the workload name or identification information while retrieving less data, or no data, from the identity storage 206. The WCS 102 receives a user input indicating that the desired state of the workload 214 is workload execution on multiple different execution environments. The IAM broker 202 calls the IAM APIs 210a, 210b of the appropriate execution environments 104a, 104b. The IAM broker 202 uses stored cloud account credentials 208 to properly authenticate and authorize calls to the execution environment IAM APIs 210a, 210b by calling an IAM API 210a, 210b for each execution environment 104a, 104b identified in the user request. The IAM broker 202 provisions, for each of the requested execution environments 104a, 104b, a logical identity corresponding to the canonical identity created and managed by the WCS 102. In the case of AWS, the IAM API for the AWS execution environment would return a new role, in the case of GCP, the IAM API for the GCP execution environment would return a service account, in the case of Azure, the IAM API for the Azure execution environment would return a Managed Identity, and other cloud service provider execution environments would similarly return a relevant logical identity. These logical identities or identity constructs may be called different names and have different attributes in different execution environments.

Once the IAM broker 202 obtains the logical identity from at least one IAM API 210a, 210b the IAM broker 202 determines what authorization policy the IAM broker 202 needs to provision for each execution environment 104a, 104b. The IAM broker 202 determines the authorization policy by inspecting the desired state from the user request and translating the authorization policy into a data structure reflecting a logical authorization policy understood by the target workload execution environment. Different cloud service providers or different execution environments have different nomenclature, representation and management interfaces for identity, and also have different mechanisms and terminologies for authorization representation, conveyance and management. For example, in AWS, authorization data may be stored in a Policy Document, and in GCP authorization data is conveyed and managed as a Binding. While the different execution environments all use an authorization policy, the data formats, APIs, terminology and other aspects are different. In some embodiments, the WCS 102 or IAM broker 202 translates a canonical policy stored and managed by the WCS 102 into one or more workload execution environment-specific constructs associated with logical authorization policies and using the respective format, notations, API, and related data for the logical authorization policy required by the relevant execution environment. For example, the WCS 102 may store a canonical authorization policy or authorization policy data in a format such as extensible access control markup language (XACML), open policy agent (OPA), JavaScript object notation (JSON) or a proprietary data structure. The IAM broker 202 translates the canonical authorization policy stored by the WCS 102 into one or more logical authorization policies representing a specific cloud platform authorization data structures. The JAM broker 202 then calls the appropriate IAM APIs 210a, 210b in one or a plurality of cloud platforms, and where applicable, a specific set of regions within a specific set of cloud platforms.

The IAM Broker 202 calls the IAM API 210a to cause the execution environment 104a to apply a logical authorization policy for the workload 214 in the respective execution environment 104a. In some embodiments, the same IAM API 210a may handle both creation of identities and application of the authorization policy, and in other embodiments separate IAM APIs 210a handle creation of the identities and the application of the authorization policy. Once the logical identity generated by the WCS 102 is created within the execution environment 104a, 104b, and a logical authorization policy is applied for the logical identity, the prerequisite condition exists to enable and authorize execution of a workload 214 in the relevant execution environment 104a, 104b.

The WCS 102 determines, from the desired state indicated by the user request which execution environments 104a, 104b to which the workload 214 should be deployed. For example, the user request may indicate that the workload 214 should be deployed to only the first execution environment 104a, to only the second execution environment 104b, or to both the first execution environment 104a and the second execution environment 104b. The WCS 102 initiates network calls to workload APIs 212 of the relevant execution environment 104a, 104b. The workload API 212 causes instantiation or spawning of a computer program such as the workload 214 in the relevant execution environment 104a, 104b. A workload 214 is managed and defined by the WCS 102 while being executed within an execution environment 104a, 104b based on the desired state indicated in the user request. The WCS 102 stores a unique identifier representing and identifying the workload 214 throughout the system 200.

During execution, the workload 214 makes network calls to cloud services 222a that are specific to the particular cloud provider. The network calls may be to implement functionality required by the workload 214 and are initiated by programming or computer instructions in the logic of the workload 214. The workload 214 consumes services that are specific to the various cloud services 222a. For example, a payroll-calculating workload may read employee data stored in a DynamoDB database cloud service managed by AWS. Regardless of where a workload 214 is deployed in terms of cloud provider or private data center, the workload 214 is able to consume the cloud service 222a without being modified yet can still be authenticated and authorized by the target cloud service 222a. However, a workload may depend on one or a plurality of services in a variety of clouds, and may use authentication or credentials supplied by the WCS 102 to access cloud services 222b in other execution environments 104b. For example, a workload 214 may access a database in a first execution environment, and an image storage system in another execution environment. There is no limitation to the number of cloud providers on which a workload 214 can depend and consume throughout its execution lifespan. The workload 214 can make successful authenticated and authorized calls to the cloud service 222a on the first execution environment 104a, and without modification also successfully call and consume service, authenticated and authorized from Cloud Service 222b on Cloud Platform 2 104b.

In some embodiments, the WCS 102 provisions a request routing element such as a networking sidecar (Net SC) 216 executable as part of the credential handler 224 provided in the host account 204. In some embodiments, a workload 214 is deployed with a configuration that causes the workload 214 network interface to direct network packets through the Net SC 216, which routes network calls to a universal instance metadata service 218 (UIMS) provided as part of the credential handler 224.

As an example, the Net SC 216 might, in an embodiment, include an intelligent proxy such as Envoy proxy software managed by Istio management software. The WCS 102 communicates with the execution environment 104a, 104b to cause the execution environment 104a, 104b, or software running on the execution environment 104a, 104b to instantiate or run the Net SC 216. Thus, in the example where the Net SC 216 is Envoy proxy software managed by Istio management software, the WCS 102 may communicate with the Istio management software resident on the execution environment 104a to start the Envoy proxy software as the Net SC 216.

The configuration of the Net SC 216 may be handled by the execution environment 104a, 104b when the host account 204 or credential handler 224 are instantiated or provisioned, by scheduling software or container management software handling instantiation or provisioning of modules or workloads, by direct configuration of the Net SC 216 using, for example, a configuration file such as a hosts file, an iptables file or configuration or the like, manually applying one or more settings, or the like, by configuring the Net SC 216 dynamically, or by another configuration method.

For example, in some embodiments, Kubernetes container management software may be used to orchestrate virtual machine clusters for the execution environments 104a, 104b and handle scheduling of containers to run in the execution environments 104a, 104b. Workloads are instantiated as pods by Kubernetes in the execution environments 104a, 104b. The Kubernetes pod scheduling system spawns running container instances from specified container images. The Kubernetes management software manages the virtual networking interfaces of the containers, and may in some embodiments, use iptables or similar mechanism to set the routing for the Net SC 216. In such an embodiment, Istio management software or a similar Kubernetes-compatible network mesh software may be utilized to configure the virtual network interfaces of containers to route IP packets in accordance to a specified policy. In some embodiments, the policy may dictate that all packets are routed through the Net SC 216, which then analyzes the destination in the network request to determine whether the network request is an instance metadata service request, which is sent to the UIMS 218.

In some embodiments, when a workload 214 requests valid security credentials for a service on which the workload 214 depends and to which the workload 214 requires access, the workload 214 sends, to a predetermined target location, an instance metadata service request message requesting the credentials associated with the workload's identity. In some embodiments, the Net SC 216 acts as a proxy, and may selectively route network packet traffic to a UIMS 218, depending on the content of the packet traffic, or the location of the requested data. Thus, the Net SC 216 may determine that a message, such as a communication or data transmission, is an instance metadata service request in response to the communication being sent to the predetermined target location.

In some embodiments, the Net SC 216 allows the credential handler 224 to replace a regular instance metadata service provided by the execution environment 104a with a UIMS 218 by selectively routing network traffic to the UIMS 218 instead of the execution environment-provided instance metadata service. Thus, in some embodiments, traffic from a workload 214 associated with the Net SC 216 or running in the same host account 204, or on the same execution environment 104a, 104b as the Net SC 216, may be routed to a UIMS 218 provided in the host account 204 as part of the credential handler 224. The UIMS 218 may then retrieve a security token or authorization token from a security token service (STS) 220a, 220b of the relevant execution environment 104a, 104b, to allow the workload 214 to access the cloud service 222a, 222b of the relevant execution environment 104a, 104b.

In some embodiments, the predetermined target location of the instance metadata service may be a predetermined internet protocol (IP) address, uniform resource locator (URL), uniform resource identifier (URI), network alias, file location, path information, or the like or any combination of the same. In some embodiments, the predetermined instance metadata service IP address is 169.254.169.254. This predetermined IP address may be used by cloud service providers as the address for an instance metadata service, which provides a workload 214 with metadata information about itself. In some embodiments, the metadata information includes credentials, and the credentials may be a string token, identifier, object key, or other data that is used to positively identify an entity, such as a workload. The predetermined target location may be the same for different cloud providers, or may be different for one or more cloud providers.

In some embodiments where the predetermined target location is a target IP address, the Net SC determines the appropriate location to which to route the request according to the data indicating the instance metadata service request from the workload 214. The request, which may include the IP address itself, path information, parameters passed, or the like. In some embodiments, the Net SC 216 may use data other than the IP address in the instance metadata service request to determine the appropriate target location to which to route the request. The Net SC 216 may route non-Instance Metadata Service traffic, that is packets traffic or data for communications other than the instance metadata service request traffic, normally. The Net SC 216 routes instance metadata service requests to a process, such as the UIMS 218, which listens on a particular IP address and transport control protocol (TCP) port.

The UIMS 218 may, in some embodiments, be computer instructions, a software module, computer program, process, service, or the like, running in the host account 204 on the execution environment 214a. The UIMS 218 inspects incoming requests to determine to which cloud provider the request is intended. In some embodiments, the UIMS 218 parses destination data in an instance metadata service request from the workload 214, such as an URL or URI string, and identifies the target cloud platform according to data in the URL string. For example, a instance metadata service request in the Amazon Elastic computing cloud (AWS EC2) might be to a predetermined location "http://169.254.169.254/latest/metadata/iam/security-credentials/s3access," while an instance metadata service request in the Google Cloud service Compute Engine may be to a predetermined location "http://metadata.google.internal/compute-Metadata/v1/instance/service-accounts/default/token" or "http://169.254.169.254/computeMetadata/v1/instance/service-accounts/default/token," and an instance metadata service request in a Microsoft Azure Virtual Machine might be to a predetermined location "http://169.254.169.254/metadata/identity/oauth2/token." Notably, the IP address 169.254.169.254 can be used in all of the above examples, yet the path information, or destination data denoted after the IP address, is different for each of the above-cited examples, and the UIMS 218 may determine the relevant target cloud service 222a, 222b according to the path information. In some embodiments, a textual alias such as a DNS name that resolves to 169.254.169.254 may be used interchangeably with the IP address.

In some embodiments, the UIMS 218 determines, based on the URL pattern or path information, to which cloud provider the request is intended. Since the format of at least a portion of the URL or URI is different, the UIMS 218 is able to distinguish between calls destined to AWS, GCP, Azure, and the like.

In other embodiments, the UIMS 218 distinguishes between calls for the different cloud providers using data from the instance metadata service request in addition to the URL data, or in place of the URL data. For example, the UIMS 218 may also use header data, data from the request, external data from, for example, another request, session information, or the like, to determine the target cloud platform.

After the UIMS 218 receives and parses the URL path conveyed from the workload by the Net SC 216 and determines which cloud provider a request is intended for, the UIMS 218 determines the canonical identity of the workload 214. In some embodiments, the canonical identity is injected to the instance metadata service request header by the Net SC 216 or transmitted by the Net SC 216 separately from the instance metadata service request, and in some embodiment the UIMS 218 determines the canonical identity by inspecting the header data conveyed by the workload 214 and passed through the Net SC 216. The Net SC 216 receives the canonical identity from the WCS 102 and conveys it to the UIMS 218. The UIMS 218 then initiates a network call to the WCS 102 to obtain the mapped cloud-specific identity data, or logical identity corresponding to the canonical identity. Using the logical identity, the UIMS 218 contacts the STS 220a, 220b of the target execution environment 104a, 104b to get a security token associated with the logical identity.

For example, for a workload 214 deployed on a GCP execution environment 104a, when the workload 214 needs to consume or access a cloud service 222b service provided by the AWS DynamoDB service, which is part of a different execution environment 104b. In some embodiments, the workload 214 utilizes a DynamoDB software development kit (SDK), which is a library or set of modules comprised of computer instructions, and that cause a network request to a predetermined IP address of the Instance Metadata Service provided by the execution environment 104a, The workload 214 obtains credentials for accessing the DynamoDB through the SDK. However, since the workload 214 is provisioned alongside the Net SC 216, network requests from the workload 214 to the predetermined address for the Instance Metadata Service provided by the execution environment are intercepted by the Net SC 216 and routed to the UIMS 218. The UIMS 218 then determines that the request for credentials is directed to the second execution environment 104b, which is different than the first execution environment 104a in which the UIMS 218 is executing. In this example, the credentials requested grant access to a cloud service 222b on a different cloud, which, in this example, is an AWS execution environment as the second execution environment 104b. The UIMS 218 retrieves credentials by utilizing its cache, or by communicating with the WCS 102 over a network connection. In some embodiments, the credentials may represent a local identity with an associated logical authorization policy that has an associated local authorization policy. The retrieved credentials, being associated with a local authorization policy that grants sufficient authorization permissions to permit the workload 214 to access the target execution environment/cloud platform (in this example, the second execution environment 104b being an AWS execution environment). The UIMS 218 then calls the Security Token Service (STS) 220b that is on the target execution environment 104b, and which is provided by cloud service providers. In some embodiments, the request to the STS 220b acts as an "assumeRole" request, which is an operation that requests a token representing a particular identity and requires authorized credentials to make the request for the token. Since the target cloud provider/ execution environment 104b (AWS) in this example already has an identity (or role in the AWS system) corresponding to the workload 214 canonical identity that is assigned the sufficient permissions, the returned token sent back from the STS 220b represents valid credentials that grant the workload 214 the ability consume the services of the target cloud service 222b (DynamoDB in this example). The STS token is returned to the UIMS 218 and the UIMS 218, in turn, returns the received token to the workload 214 via the Net SC 216. The workload 214 then calls the target cloud service 222b (DynamoDB in this example), passing in the retrieved token to the target cloud service 222b over a network connection.

Thus, a workload 214 deployed to one execution environment 104a, can access or consume cloud services 222b that are deployed to one or more different execution environments 104b associated with other or foreign cloud regions or cloud providers. The workload 214 need not be aware on which cloud platform, region or other execution environment on which the workload 214 is executing, as the workload makes any requests or calls to any platform, and the credential handler 224 intercepts the requests or calls to for metadata to provide the appropriate credentials for access to the appropriate cloud service 222a, 222b on the appropriate execution environment 104a, 104b.

Thus, a UIMS 218 may be a masquerading instance metadata service to which instance metadata service requests originating from a workload 214 on a first cloud platform or execution environment 104a are routed. The masquerading instance metadata service or UIMS 218 returns, to the workload 214, valid credentials that are credentials to a service operating in a second cloud platform or execution environment 104b. The workload 214 on the first execution environment 104a can thus successfully consume a cloud service 222b of the second execution environment 104b using the credentials.

Additionally, a workload 214 can successfully consume one or more cloud services 222a from cloud providers on the same cloud or execution environment 104a on which the workload 214 is deployed, and can also successfully consume one or more cloud services 222b deployed on different clouds or different execution environments 222b. In some embodiments, the workload 214 can be deployed to different cloud platforms while still able to consume cloud services 222a, 222b from the multiple cloud platforms without having to modify the workload's source code or configuration.

In other embodiments, the system 200 may employ a request routing element that is different from the Net SC 216, and that selectively or non-selectively routes communications from the workload 214 to the UIMS 218. For example, in some embodiments, the system 200 may have a request routing element that routes all communications from the workload 214 to the UIMS 218 or to another element for determination of whether the communication is an instance metadata service request. In another example, the system 200 may have a request routing element that selectively routes communications to the UIMS 218 or to another destination based on whether the communication is determined to be an instance metadata service request. Thus, in some embodiments, a request routing element may be provided and configured to detect communications from the workload 214 and route the communications according to a rule, parameter, or other configuration that effectively permits the request routing element to determine whether the communication is an instance metadata service request, so that the request routing element routes the communication to the UIMS 218 or to another element. Additionally, in some embodiments, the routing by the request routing element may be performed according to destination data, or other data in the communication, according to the network characteristics of the communication, such as the port, sender IP address, network interface, sender, destination path or the like, according to data in another separate message, or using another configuration or parameter.

In some embodiments, the request routing element may be a physical or virtual switch configured with one or more routing rules or parameters, a network stack or modified network interface card (NIC) instructions, operating system kernel or module instructions, physical or software-based firewall, filter, proxy, or the like. In such embodiments, the request routing element may have rules that identify the communication as an instance metadata service request based on the destination data, path or destination IP address being a predetermined target address, such as, for example a network request with a destination IP address of 169.254.169.254. The request routing element may intercept the communication when originally addressed to the predetermined target address so that it does not reach its originally intended destination, and instead, transparently send the communication to the UIMS 218. For a communication that is intended for a destination other than the predetermined target address, the request routing element may route the communication on to the destination originally identified in the communication.

Figure 3:
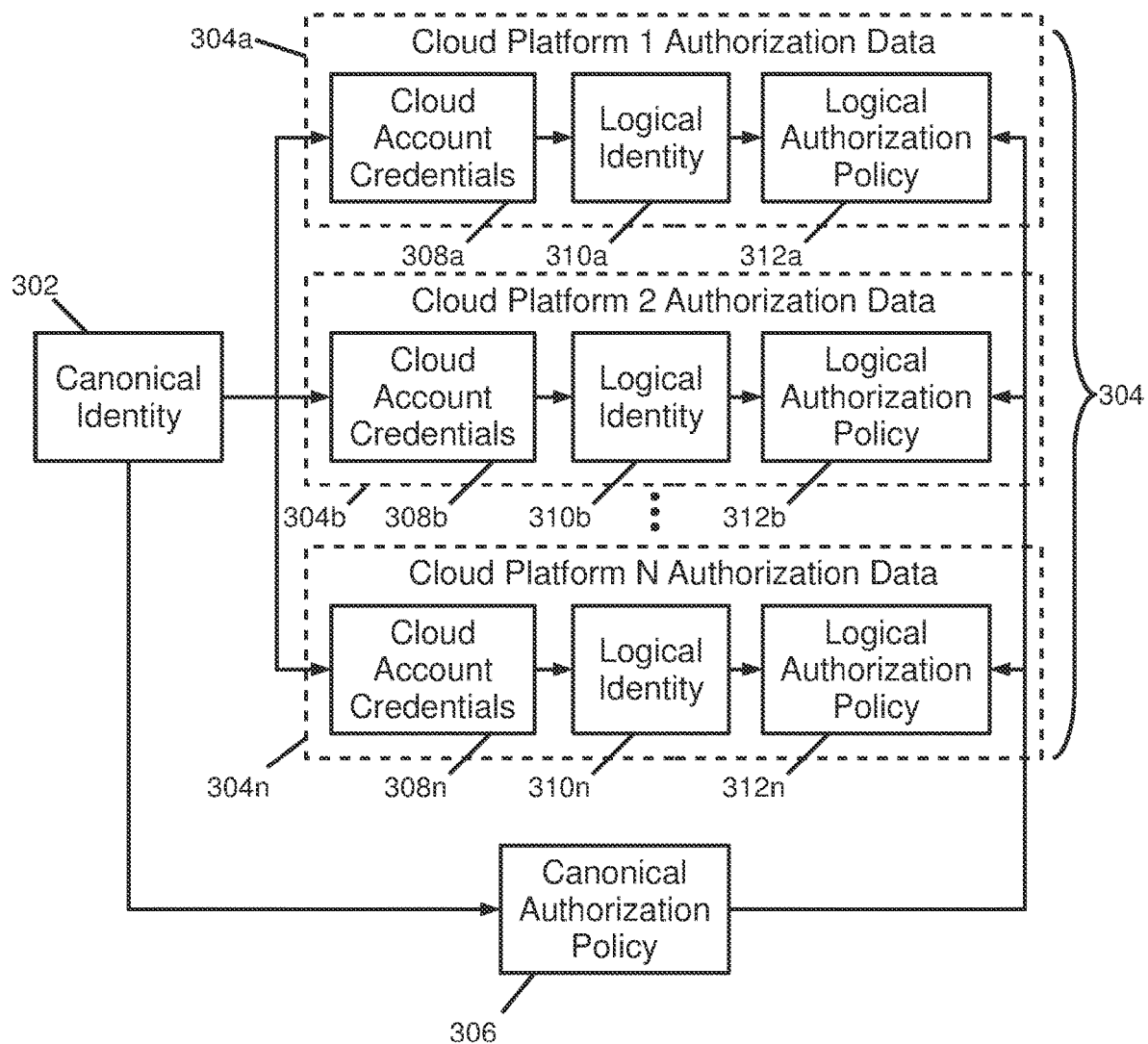
FIG. 3 is a diagram illustrating an identity relationship structure according to some embodiments.

FIG. 3 is a diagram illustrating an identity relationship structure 300 according to some embodiments. A canonical identity 302 is associated with a set of platform data 304 comprised of one or more platform data elements 304a . . . 304n. Each platform data element 304a . . . 304n may include data related to authorization credentials for a particular cloud platform, cloud region, execution environment, or the like, and may have a logical identity 310a . . . 310n. A customer provides cloud account credentials 308a . . . 308n for a particular platform, and the WCS provisions an individual logical identity 310a . . . 310n for each cloud platform. The canonical identity 302 may have an associated canonical authorization policy 306. A logical authorization policy 312a . . . 312n based on the canonical authorization policy may be applied to the logical identities 310a . . . 310n, permitting customization of the authorization of the relevant logical identity 310a . . . 310n for the associated cloud platform.

Figure 4:
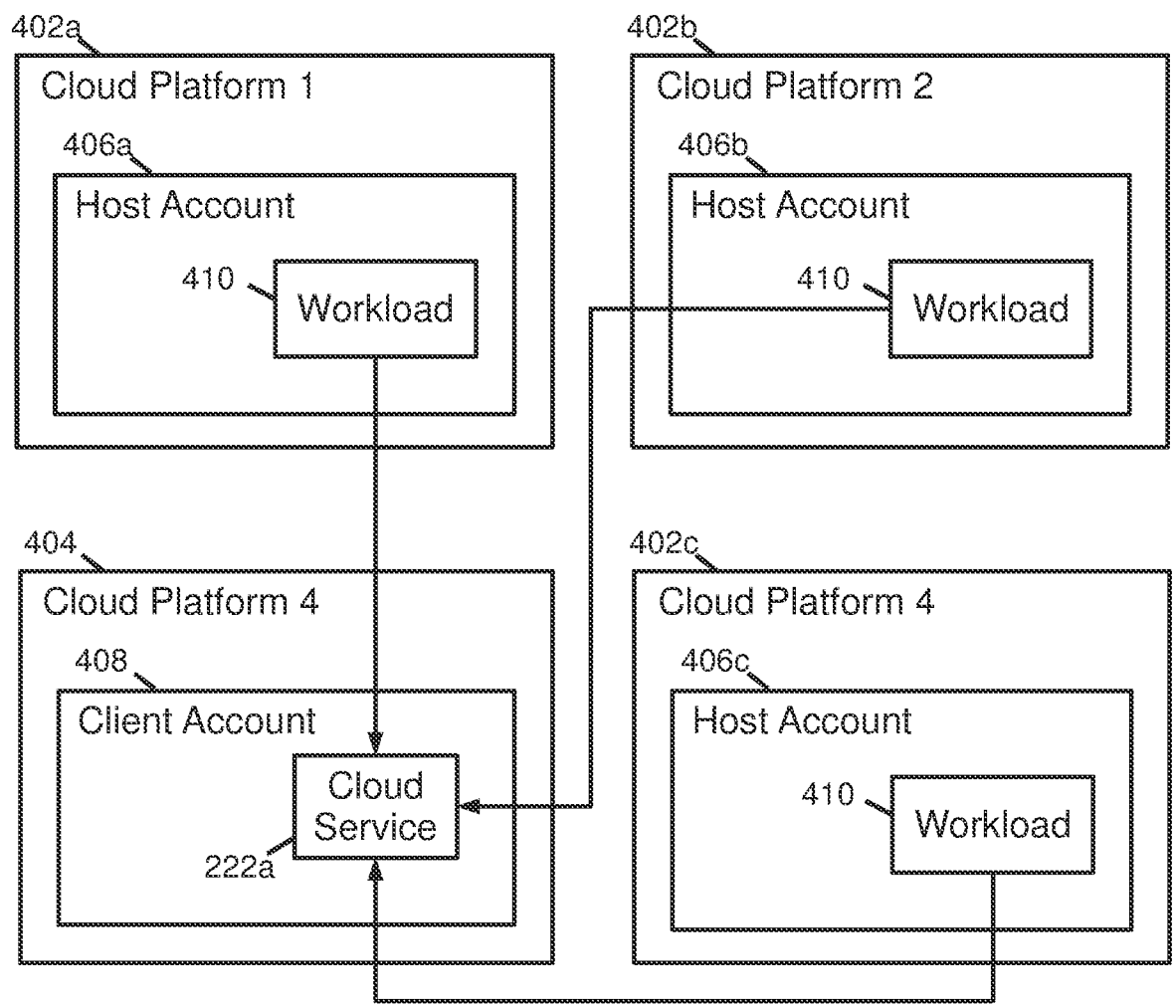
FIG. 4 is a diagram showing a system for providing access to a cloud service from hosting cloud platforms according to an embodiment.

FIG. 4 is a diagram showing a system 400 for providing access to a cloud service 222a from hosting cloud platforms 402a . . . 402c according to an embodiment. A workload 410 may be deployed on multiple different cloud platforms 402a . . . 402c that each access a cloud service 222a on a target cloud platform 404. The cloud service 222a may run in a client account 408, and the workloads may be granted access to the cloud service by generating or retrieving credentials for the workload 410 to access the cloud service 222a. Notably, the same workload 410 may be hosted on each hosting cloud platform 402a . . . 402c since the workload makes the same call to the cloud service 222a. For example, the first hosting cloud platform 402a may be a GCP execution environment, with the workload 410 for the first hosting cloud platform 402a running in a first host account 406a specific to the first cloud platform 402a, the second hosting cloud platform 402b may be a AWS execution environment, with the workload 410 for the second hosting cloud platform 402b running in a second host account 406b specific to the second cloud platform 402b, and the third hosting cloud platform 402c may be an Azure execution environment, with the workload 410 for the third hosting cloud platform 402c running in a third host account 406c specific to the third cloud platform 402c. The workloads 410 running on the different hosting cloud platforms 402a . . . 402c all call the same cloud service 222a, and thus, make the same calls, regardless of whether the hosting cloud platform 402a . . . 402c is the same type of cloud platform as the target cloud platform 404. Thus, the workloads 410 do not need to be specific to the hosting platform 402a . . . 402c on which the individual workloads 410 run.

In some embodiments, the ability to run a particular workload 410 on more than one hosting cloud platform 402a . . . 402c without modification permits selection of a hosting cloud platform at the time the workload 410 is started or executed. For example, a WCS or other management system may determine which hosting cloud platform the workload should run on based on platform specific factors such as pricing, available bandwidth, response times, vendor preference, or may aggregate different workloads 410 into a single hosting cloud platform 402a . . . 402c to take advantage of bulk pricing or hosting time sharing to reduce costs or increase workload efficiency.

For example, in an embodiment, a workload 410 may be run on a first hosting cloud platform 402a such as the GCP platform on a weekend when pricing is cheaper than other hosting platforms, and may be run on another, second hosting platform 402b, such as an AWS platform, during weekdays when that particular hosting platform is cheaper than the other platforms.

In another embodiment, multiple workloads may be executed in a same host account that provides computation resource (such a processor time or memory usage), which may be billed based on time and the amount of resource used. Multiple workloads may be run in a single, first host account 406a, with the first host account 406a being billed for computation resource usage. Thus, multiple small workloads 410 may be aggregated to take advantage of bulk pricing for computation resource usage. In some embodiments, a WCS or other management system may move the workloads 410 between different hosting cloud platforms 402a . . . 402c as workloads 410 are added or dropped, or as the computation resource demands of the workloads 410 change, with the WCS or management system selecting the hosting cloud platform 402a . . . 402c to optimize the computing resources purchased for executing the workloads 410.

Figure 5:
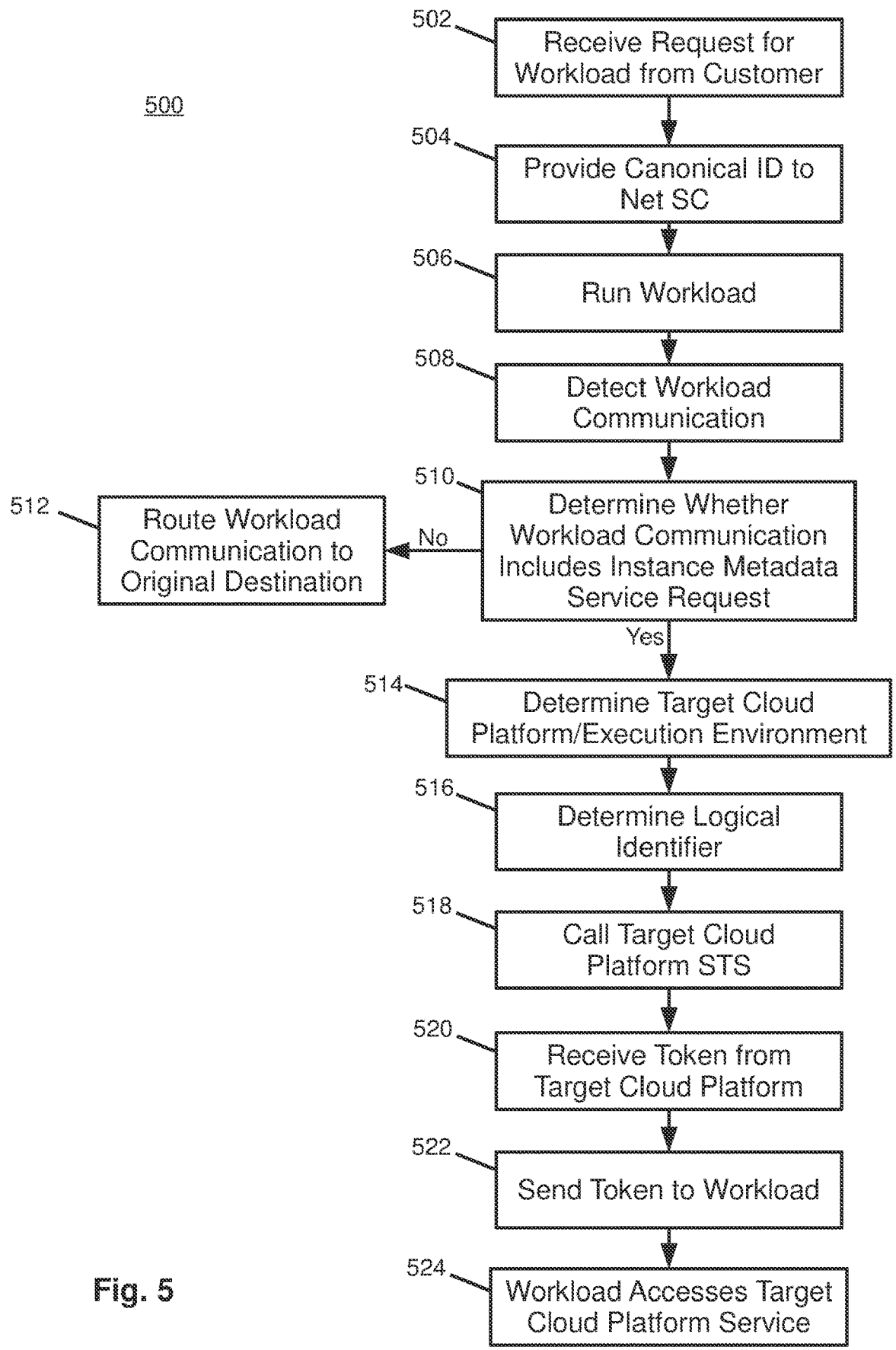
FIG. 5 is a flow diagram illustrating a method for providing cross-cloud platform authentication according to some embodiments.

FIG. 5 is a flow diagram illustrating a method 500 for providing cross-cloud platform authentication according to some embodiments. In block 502, a WCS receives a request for a workload from a customer. The workload request may be from a person or may be from a computing process or other automated system. The workload request may indicate a desired state for the workload, such as a running or executing state. In some embodiments, the WCS may provide a canonical identity to a credential handler or Net SC in block 504, and the canonical identity may be associated with the workload, so that when the workload makes instance metadata service requests, the credential handler uses the canonical identity to request a logical identity for the workload. In other embodiments, the WCS may track the canonical identity of the workload and may determine the canonical identity of the workload from requests made to the WCS on behalf of the workload.

In block 506, the workload is run. In some embodiments, the workload may be executed on the cloud platform in response to a request sent to the workload API of the cloud platform by the WCS. In some embodiments, the credential handler monitors or intercepts communications or requests from the running workload, and in block 508, the credential handler detects a workload communication. In some embodiments, the Net SC acts as a proxy, to handle communications to and from the workload so that the Net SC is able to examine each outgoing request.

When the credential handler detects a communication from the workload, the credential handler determines whether the workload communications includes an instance metadata service request in block 510. In some embodiments, the Net SC determines the destination of the communication, and determines that the communication is an instance metadata service request if a destination IP address of the communications is a predetermined IP address such as 169.254.169.254. In other embodiments, the Net SC may determine the destination of the communications from, for example, data in a header of the destination data in the instance metadata service request or packet carrying the communication, from data in the body of the communication, destination data in the instance metadata service request, or from transmission parameters such as a transmission protocol, communications port, or the like, a combination of any of the same, or a combination of the same together with the destination address or destination data. In some embodiments, the Net SC determines the communication to be an instance metadata service request in response to the destination of the communication being an instance metadata service that returns an authentication token.

When the credential handler determines that the communications is not an instance metadata service request, the credential handler routes the communication to its original destination in block 512. In some embodiments, the credential handler forwards or transmits the communication without modification or without changing any credentials or destination data in the communication.

When the credential handler determines that the communications is an instance metadata service request, the credential handler, in block 514, determines the target cloud platform or execution environment. In some embodiments, the Net SC determines the destination of the communication, and if the communication is an instance metadata service request, the Net SC forwards the communication to the UIMS, avoiding sending the instance metadata service request to the cloud platform-provided IMS or native IMS. The UIMS may then determine the target cloud platform from which to obtain credential data for the particular request. In other embodiments, the Net SC and UIMS may be integrated into a single module and may determine whether the communication is an instance metadata service request and the target cloud platform in a single process. The target cloud platform may be determined from data in the communications, and in some embodiments, may be determined by the UIMS parsing the URL or the destination of the instance metadata service request to determine the path of URL, or by the UIMS determining data in the request such as a format of the request, header data, or the like. The Net SC may also identify the workload to the UIMS, and in some embodiments, may insert or inject the canonical identity, or another workload-specific identifier, into the instance metadata service request, for example in a header, or pass along the workload identifying information in a separate message, signal communication, or the like.

In block 516, the credential handler determines a logical identity for the workload. In some embodiments, the UIMS requests the logical identity from the WCS, and passes the canonical identity, or other workload-identifying information, back to the WCS. The WCS returns a logical identity associated with the workload and the target cloud platform. In some embodiments, an authorization policy is associated with the logical identity, and may be linked or applied to the logical identity by the WCS when the logical identity is created, when the workload is instantiated, when the logical identity is requested by the UIMS, or at another time.

In block 518, the credential handler calls the target cloud platform STS. In some embodiments, the UIMS sends a token request, such as an "assumeRole" request, to the target cloud platform STS, with the UIMS identifying the workload using the logical identity associated on the target cloud platform with the workload. In embodiments where the target cloud platform is a cloud platform that is different than the cloud platform on which the workload is running, the UIMS sends the token request to a foreign, or outside, cloud platform. In block 520, the credential handler receives an authentication or security token from the target cloud platform. In some embodiments, the UIMS receives a string, key, or other data for use as the token for authentication on the target cloud platform.

In block 522, the credential handler sends the token from the target cloud platform STS to the workload. In some embodiments, the UIMS may send the received token to the workload through the Net SC so that the token appears to come from the cloud platform provided IMS or native IMS. In block 524, the workload accesses the cloud service on the target cloud platform. In some embodiments, the instance metadata service requests are made by an SDK or other portion of the executing workload as part of a request to access the cloud service, and the token may be used by the workload to successfully complete the cloud service access.

Figure 6:
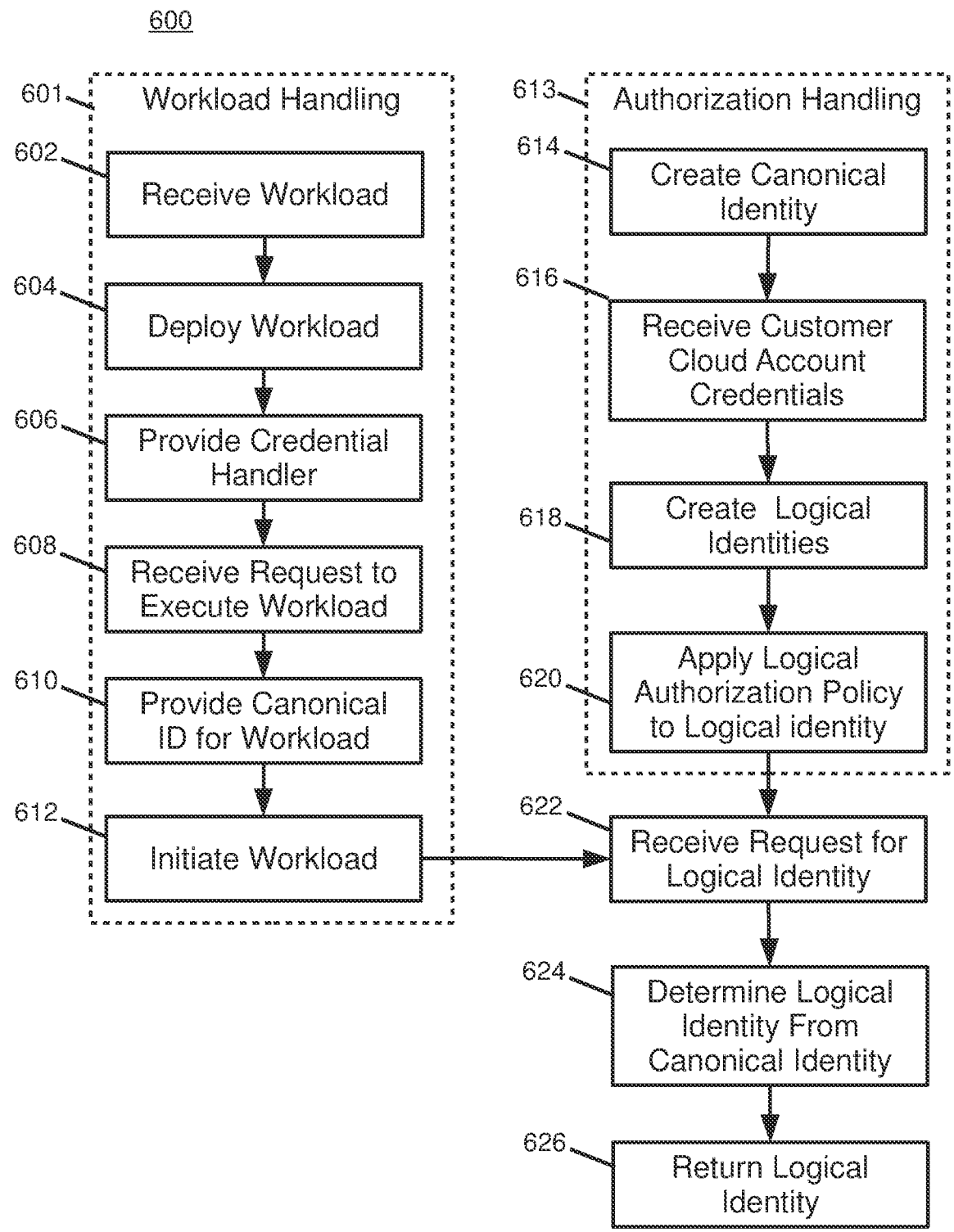
FIG. 6 is a flow diagram illustrating a method for providing logical identities for providing cross-cloud platform authentication according to some embodiments.

FIG. 6 is a flow diagram illustrating a method 600 for providing logical identities for providing cross-cloud platform authentication according to some embodiments. The method 600 may include providing workload handling in block 601, and may include the processes or elements of blocks 602 through 612, described below. Additionally, the method 600 may include authorization handling in block 613, and may include the processes or elements of blocks 614 through 620, described below.

The workload handling of block 601 provides features for acquiring, provision and starting a workload. In block 602, a WCS receives a workload. The workload may be a containerized piece of code that, in some embodiments, is containerized as a Docker container, or is an executable, module, or other software system.

In block 604, the workload is deployed. The workload may be deployed to and executed on one or more target cloud platforms or other execution environments, into an account environment provisioned for the workload. In block 606, a credential handler is provided. In some embodiments, the credential handler may include a Net SC and a UIMS, and the Net SC may be set as a proxy for communications from the workload.

In block 608, a request to execute the workload is received. The request may be a user request indicating that a desired state for the workload is a running state. In block 610 a canonical ID is provided for the workload. In some embodiments, the credential handler receives the canonical identity from the WCS and associates the workload with the canonical identity. The WCS may receive the request to execute the workload and may communicate with a workload API on the relevant cloud platform to cause the cloud platform to run or otherwise execute the workload.

The authorization handling of block 613 may provide features for handling canonical and logical identities and applying authorization policies to the logical identities. In block 614, a canonical identity for the workload is created. The canonical identity is an identifier associated with the workload, and is saved in an identity store by the WCS. The canonical identity may be used to reference one or more logical identities associated with particular cloud platforms and also with the workload.

In block 616, customer cloud account credentials are received at the system. In some embodiments, the WCS receives the customer cloud account credentials. The customer cloud account credentials may be, for example, a token, key, or the like that permits authentication to a cloud account for a customer that wants to run the workload. In block 618, the system creates logical identities. In some embodiments, the WCS uses the customer cloud account credentials to authorize creation of one or more logical identities for the customer cloud accounts on the relevant cloud platforms. The logical identities may be associated with a particular workload, so that each workload has a logical identity on each cloud platform the customer identifies for potentially running the workload. Logical identities may be shared by different workloads, or may be specific to a workload image.

In block 620, one or more logical authorization policies are applied to corresponding logical identities. In some embodiments, the logical authorization policies may be rights grants for the logical identity associated with the workload, and may be derived from a canonical authorization policy according to the requirements of the workload and the accepted authorization construct of the executing cloud platform.

After the workload is initiated in block 612, a request for a logical identity is received in block 622. In some embodiments, the WCS receives the logical identity request from the UIMS as a result of the workload making an instance metadata service request to access a cloud service. The logical identity request may identify the canonical identity of a workload, and a target cloud platform. In lock 624, the logical identity is determined according to the canonical identity. In some embodiments, the logical identity may also be determined according to the target cloud platform so that a logical identity for a workload to access is a particular cloud platform may be identified by the WCS. Once the relevant logical identity is determined, the logical identity is returned back to the credential handler in block 626, and passed back to the workload, allowing the workload to access a foreign or outside cloud service using the logical identity.

An embodiment system may have a non-transitory computer readable medium having a program stored thereon for execution by a computer processor, the program including instructions to route a first network call that originates from a workload in a first cloud computing environment and that is addressed to a first cloud computing environment instance metadata service (IMS) identified by destination data comprising an internet protocol (IP) address of 169.254.169.254 to a universal IMS (UIMS) different from the first cloud computing environment IMS and running on the first cloud computing environment, route a second network call that originates from the workload and that is addressed to a destination other than the first cloud computing environment IMS to the destination indicated by the second network call, respond to the first network call with credentials that are valid for accessing a cloud service provided in a second cloud computing environment separate from the first cloud computing environment, where the workload is operable to access the cloud service from the first cloud computing environment, and where the workload is further operable to access the cloud service from a third cloud computing environment different from the first cloud computing environment.

In some embodiments, the program further includes instructions to identify the second cloud computing environment according to path information of the destination data, and retrieve a logical identity from a workload control system (WCS) according to the identification of the second cloud computing environment, and retrieve the credentials from a security token service of the second cloud computing environment. In some embodiments, the instructions to retrieve the logical identity include instructions to retrieve the logical identity from the WCS according to the identification of the second cloud computing environment and a canonical identity of the workload. In some embodiments, the program further includes instructions to determine the canonical identity of the workload from canonical identity data in the first network call, where the canonical identity data is injected into the first network call by a portion of the first cloud computing environment after the workload originates the first network call. In some embodiments, the instructions to retrieve the logical identity from the WCS includes instructions to send, by the UIMS, to the WCS, a logical identity request requesting a logical identity for the workload, and receive, by the UIMS, from the WCS, a message indicating the logical identity, where the logical identity request comprises data indicating the canonical identity and the second cloud computing environment.

An embodiment system includes a processor, and a non-transitory computer readable medium having a program stored thereon for execution by the processor, the program including instructions to receive an instance metadata service request sent by a workload operating on a first execution environment of a first cloud computing platform to an instance metadata service of the first execution environment, determine a target cloud platform of the instance metadata service request, wherein the target cloud platform is a second cloud computing platform different than the first cloud computing platform, determine a canonical identity of the workload, determine, according to the canonical identity and the target cloud platform, a logical identity associated with the workload by the target cloud platform, and retrieve a security token from a security token service on the target cloud platform, where the security token is data authorizing the workload to access a cloud service on the target cloud platform.

In some embodiments, program further includes instructions to detect a communication from the workload, determine, according to destination data in the communication, whether the communication is the instance metadata service request, and forward, in response to determining that the communication is not the instance metadata service request, the communication to a destination indicated by the destination data. In some embodiments, the program further includes instructions to intercept, in response to determining that the communication is the instance metadata service request, the communication and avoid sending the communication to the destination indicated by the destination data. In some embodiments, the instructions to determine, according to the destination data in the communication, whether the communication is the instance metadata service request include instructions to determine that the communication is an instance metadata service request in response to the destination in the destination data being a predetermined target location associated with the instance metadata service of the first execution environment, and determine that the communication is a not the instance metadata service request in response to the destination in the destination data being other than the predetermined target location associated with the instance metadata service of the first execution environment. In some embodiments, the destination is identified by an internet protocol (IP) address of 169.254.169.254. In some embodiments, the instructions to determine the logical identity associated with the workload include instructions to send, to a control system, a logical identity request requesting a logical identity for the workload, and receive a message indicating the logical identity. In some embodiments, the logical identity request includes data indicating the canonical identity and the target cloud platform. In some embodiments, the instructions to determine the target cloud platform of the instance metadata service request include instructions to determine the target cloud platform based on path information conveyed in a destination uniform resource identifier (URI) of the instance metadata service request.

An embodiment method includes receiving, by a universal instance metadata service (UIMS) operating on a first execution environment of a first cloud computing platform, an instance metadata service request sent by a workload operating on the first execution environment, determining, by the UIMS, a target cloud platform based on the instance metadata service request, where the target cloud platform is a second cloud computing platform different than the first cloud computing platform, determining, according to a canonical identity of the workload and the target cloud platform, a logical identity associated with the workload by the target cloud platform, and retrieving a security token from a security token service on the target cloud platform, where the security token is data authorizing the workload to access a cloud service on the target cloud platform.

In some embodiments, the method further includes detecting, by a networking sidecar (Net SC) operating on the first execution environment, a communication from the workload, determining, by the Net SC, according to destination data in the communication, whether the communication is the instance metadata service request, forwarding, by the Net SC, in response to determining that the communication is not the instance metadata service request, the communication to a destination indicated by the destination data, intercepting, by the Net SC, in response to determining that the communication is the instance metadata service request, the communication and avoiding sending the communication to the destination indicated by the destination data, and sending, as the instance metadata service request and in response to the intercepting the communication, the communication to the UIMS. In some embodiments, the method further includes determining, by the Net SC, a canonical identity of the workload, injecting data indicating the canonical identity into the instance metadata service request, and determining, from the data indicating the canonical identity injected into the instance metadata service request, the canonical identity of the workload. In some embodiments, the determining whether the communication is the instance metadata service request includes determining, by the Net SC, that the communication is an instance metadata service request in response to the destination in the destination data being a predetermined target location associated with the instance metadata service of the first execution environment, and determining, by the Net SC, that the communication is a not the instance metadata service request in response to the destination in the destination data being other than the predetermined target location associated with the instance metadata service of the first execution environment, and where the destination is identified by an internet protocol (IP) address of 169.254.169.254. In some embodiments, the determining the logical identity associated with the workload includes sending, by the UIMS, to a control system, a logical identity request requesting a logical identity for the workload, and receiving, by the UIMS, from the control system, a message indicating the logical identity, where the logical identity request includes data indicating the canonical identity and the target cloud platform, and where the determining the target cloud platform of the instance metadata service request includes determining the target cloud platform of the instance metadata service request according to path information in destination data of the instance metadata service request.

An embodiment method includes providing, on a first cloud platform, a masquerading instance metadata service to which an instance metadata service request is routed, where the instance metadata service request originates from a workload deployed on the first cloud platform, providing a request routing element, and configuring the request routing element to detect a communication from the workload and selectively route the communication to the masquerading instance metadata service according to whether the communication is an instance metadata service request, where the masquerading instance metadata service returns, to the workload, valid credentials that are credentials to a cloud service operating in a second cloud platform, and where the workload successfully consumes the cloud service operating in the second cloud platform using the credentials.

In some embodiments, the workload is further deployed on a third cloud platform, where the workload, as deployed in the first cloud platform, is the same as the workload as deployed on the third cloud platform, and where the workload as deployed in the third cloud platform successfully consumes the cloud service operating in the second cloud platform.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the disclosure. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S. C. § 112 as it exists on the date of filing hereof unless the words "means for" or "step for" are explicitly used in the particular claim.

What is claimed is:

1. A method, comprising:
providing, on a first cloud platform provided by a first cloud provider, a masquerading instance metadata service configured to process instance metadata service requests that originate from a workload that is deployed on the first cloud platform and that accesses a first cloud service operating on the first cloud platform using first access credentials that are associated with a customer and that are determined according to a canonical identity that is associated with the customer and that is associated with the first access credentials;
providing a request routing element; and
configuring the request routing element to detect a communication from the workload and selectively route the communication to the masquerading instance metadata service according to whether the communication is an instance metadata service request, wherein the communication comprises data identifying the canonical identity;
wherein the masquerading instance metadata service sends, from the first cloud platform, to a second cloud service operating on a second cloud platform different from the first cloud platform and provided by a second cloud provider different from the first cloud provider, a first request that identifies the workload according to a logical identity associated with the canonical identity;
wherein the masquerading instance metadata service returns, to the workload, after receiving a response to the first request, valid credentials to the second cloud service, wherein the valid credentials are second access credentials associated with the customer allowing access by the customer to the second cloud service from the first cloud service and wherein the second access credentials are associated with the canonical identity and are invalid for accessing the first cloud service;
wherein detecting the communication from the workload and selectively routing the communication to the masquerading instance metadata service comprises:
determining, according to a destination indicated by destination data in the communication, whether the communication is an instance metadata service request according to whether the destination in the destination data is a predetermined target location that is outside of the first cloud platform or is associated with the instance metadata service; and
intercepting the communication in response to determining that the communication is an instance metadata service request requesting credentials from the second cloud platform associated, at the second cloud platform, with an identity of the workload and further in response to determining that the destination indicated by the destination is other than the first cloud platform, and avoiding sending the communication to the second cloud platform; and
wherein the workload successfully consumes, from the first cloud service, the second cloud service operating in the second cloud platform using the valid credentials.

2. The method according to claim 1, wherein the workload is further deployed on a third cloud platform, wherein the workload, as deployed in the first cloud platform, is the same as the workload as deployed on the third cloud platform, and wherein the valid credentials result in the workload as deployed in the third cloud platform successfully consuming the second cloud service operating in the second cloud platform.

3. The method according to claim 1, wherein the selectively routing the communication further comprises:
forwarding, in response to determining that the communication is not an instance metadata service request, the communication to the destination indicated by the destination data.

4. The method of claim 3, wherein the determining, according to the destination data in the communication, whether the communication is an instance metadata service request comprises:
determining whether the communication is an instance metadata service request according to whether the destination in the destination data is a predetermined target location associated with the instance metadata service.

5. The method of claim 1, further comprising:
determining the canonical identity of the workload;
determining, according to the canonical identity and the second cloud platform, a logical identity associated, by the second cloud platform, with the workload; and
retrieving a security token from a security token service on the second cloud platform, wherein the security token is data authorizing the workload to access the second cloud service on the second cloud platform.

6. The method of claim 5, wherein the determining the logical identity associated with the workload comprises:
sending, to a control system, a logical identity request requesting a logical identity for the workload; and
receiving a message indicating the logical identity.

7. The method of claim 6, further comprising determining the second cloud platform based on path information conveyed in a destination uniform resource identifier (URI) of the communication.

8. A system, comprising:
one or more processors;
a non-transitory computer readable medium storing one or more programs for execution by the one or more processors, wherein a first program of the one or more programs includes first instructions for providing a request routing element, wherein a second program of the one or more programs includes second instructions for providing a masquerading instance metadata service, and wherein the first instructions include instructions to:
detect a communication from a workload that is on a first cloud platform provided by a first cloud provider and that accesses a first cloud service operating on the first cloud platform using first access credentials that are associated with a customer and that are determined according to a canonical identity that is associated with the customer and that is associated with the first access credentials, wherein the communication comprises data identifying the canonical identity; and
selectively route, according to whether the communication is an instance metadata service request, the communication to the masquerading instance metadata service;
wherein the instructions to detect the communication from the workload and selectively route the communication to the masquerading instance metadata service include instructions to:

determine, according to a destination indicated by destination data in the communication, whether the communication is an instance metadata service request according to whether the destination in the destination data is a predetermined target location that is outside of the first cloud platform and that is associated with the instance metadata service; and intercept the communication in response to determining that the communication is an instance metadata service request requesting credentials from a second cloud platform associated, at the second cloud platform, with an identity of the workload and further in response to determining that the destination indicated by the destination is other than the first cloud platform, and avoid sending the communication to the destination indicated by the destination data; and wherein the second instructions include instructions to:

send, from the first cloud platform, to a second cloud service operating on the second cloud platform different from the first cloud platform and provided by a second cloud provider different from the first cloud provider, a first request that identifies the workload according to a logical identity associated with the canonical identity; and return, to the workload, after receiving a response to the first request, valid credentials that are second access credentials to the second cloud service operating in the second cloud platform, wherein the valid credentials are associated with the customer and allow access by the customer to the second cloud service from the first cloud service and that result in the workload successfully accessing the second cloud service from the first cloud service using the valid credentials, and wherein the second access credentials are associated with the canonical identity and are invalid for accessing the first cloud service.

9. The system according to claim 8, wherein the workload is further deployed on a third cloud platform, wherein the workload, as deployed in the first cloud platform, is the same as the workload as deployed on the third cloud platform, and wherein the valid credentials result in the workload as deployed in the third cloud platform successfully consuming, from the third cloud platform, the second cloud service operating in the second cloud platform.

10. The system according to claim 8, wherein the instructions to detect the communication from the workload and selectively route the communication to the masquerading instance metadata service further comprise instructions to:

forward, in response to determining that the communication is not an instance metadata service request, the communication to the destination indicated by the destination data.

11. The system of claim 10, wherein the instructions to determine, according to the destination data in the communication, whether the communication is an instance metadata service request include instructions to:

determine whether the communication is an instance metadata service request according to whether the destination in the destination data is a predetermined target location associated with the masquerading instance metadata service.

12. The system of claim 8, wherein the second instructions further include instructions to:

determine the canonical identity of the workload;
determine, according to the canonical identity and the second cloud platform, a logical identity associated, by the second cloud platform, with the workload; and retrieve a security token from a security token service on the second cloud platform, wherein the security token is data authorizing the workload to access the second cloud service on the second cloud platform.

13. The system of claim 12, wherein the instructions to determine the logical identity associated with the workload further include instructions to:

send, to a control system, a logical identity request requesting a logical identity for the workload; and
receive a message indicating the logical identity.

14. The system of claim 13, wherein the second instructions further include instructions to determine the second cloud platform based on path information conveyed in a destination uniform resource identifier (URI) of the communication.

15. A system, comprising:
one or more processors;
a non-transitory computer readable medium storing one or more programs for execution by the one or more processors, wherein the one or more programs includes instructions for providing a masquerading instance metadata service, and wherein the instructions include instructions to:

receive, from a request routing element, a communication that is generated by a workload that is deployed on a first cloud platform provided by a first cloud provider and that accesses a first cloud service operating on the first cloud platform using first access credentials that are associated with a customer and that are determined according to a canonical identity that is associated with the customer and that is associated with the first access credentials, wherein the communication is received by the masquerading instance metadata service as a result of the communication being selectively routed to the masquerading instance metadata service according to whether the communication is an instance metadata service request, according to a determination, according to a destination indicated by destination data in the communication, that the communication is an instance metadata service request where the destination in the destination data is a predetermined target location that is outside of the first cloud platform and that is associated with the instance metadata service, and as a result of intercepting the communication in response to determining that the communication is an instance metadata service request requesting credentials from a second cloud platform associated, at the second cloud platform, with an identity of the workload and further in response to determining that the destination indicated by the destination is other than the first cloud platform, and avoiding sending the communication to the destination indicated by the destination data, wherein the instance metadata service request comprises data identifying the canonical identity;

send, from the first cloud platform, to a second cloud service operating on the second cloud platform different from the first cloud platform and provided by a second cloud provider different from the first cloud provider, a first request that identifies the workload according to a logical identity associated with the canonical identity; and return, to the workload, after receiving a response to the first request, valid credentials that are second access credentials to the second cloud service, wherein the valid credentials are associated with the customer and allow access by the customer to the second cloud service from the first cloud service, wherein the second access credentials are associated with the canonical identity and are invalid for accessing the first cloud service, and wherein the valid credentials permit the workload to successfully use the second cloud service from the first cloud service using the valid credentials.

16. The system of claim 15, wherein the destination data is a predetermined target location associated with the instance metadata service.

17. The system of claim 15, wherein the instructions further include instructions to:
   determine the canonical identity of the workload;
   determine, according to the canonical identity and the second cloud platform, a logical identity associated, by the second cloud platform, with the workload; and
   retrieve a security token from a security token service on the second cloud platform, wherein the security token is data authorizing the workload to access the second cloud service on the second cloud platform.

18. The system of claim 17, wherein the instructions to determine the logical identity associated with the workload include instructions to:
   send, to a control system, a logical identity request requesting a logical identity for the workload; and
   receive a message indicating the logical identity.

19. The system of claim 18, wherein the instructions further include instructions to determine the second cloud platform based on path information conveyed in a destination uniform resource identifier (URI) of the communication.

* * * * *